United States Patent [19]

Sullivan

[11] Patent Number: 5,895,014
[45] Date of Patent: Apr. 20, 1999

[54] SATELLITE SOLAR ARRAY AND METHOD OF BIASING TO REDUCE SEASONAL OUTPUT POWER FLUCTUATIONS

[75] Inventor: John M. Sullivan, Manhattan Beach, Calif.

[73] Assignee: Hughes Electronics Corporation, El Segundo, Calif.

[21] Appl. No.: 08/690,702

[22] Filed: Jul. 31, 1996

[51] Int. Cl.$^6$ ........................................ B64G 1/44
[52] U.S. Cl. ........................................ 244/168; 244/173
[58] Field of Search ........................ 244/173, 168

[56] References Cited

U.S. PATENT DOCUMENTS

| | | | |
|---|---|---|---|
| 4,371,135 | 2/1983 | Keigler . | |
| 4,508,297 | 4/1985 | Mouihayrat et al. | 244/173 |
| 4,728,061 | 3/1988 | Johnson et al. | 244/173 |
| 5,228,644 | 7/1993 | Garriott et al. | 244/173 |
| 5,312,073 | 5/1994 | Flament et al. | 244/173 |
| 5,626,315 | 5/1997 | Flament et al. . | |

FOREIGN PATENT DOCUMENTS

| | | |
|---|---|---|
| 0195554 | 9/1986 | European Pat. Off. . |
| 0447049 | 9/1991 | European Pat. Off. . |
| 2450748 | 3/1979 | France . |

*Primary Examiner*—Galen L. Barefoot
*Attorney, Agent, or Firm*—Georgann S. Grunebach; M. W. Sales

[57] ABSTRACT

Existing satellite solar arrays are deployed perpendicular to the satellite so that they rotate to track the daily movement of the sun to increase the solar array's' output power. In the present invention, the solar arrays are biased by a fixed amount away from the orbit perpendicular axis to maximize their minimum output power over the seasons. As the satellite orbits about the earth, the solar array rotates about the orbit perpendicular axis along a conical path so that the array faces towards the sun and maintains its biased attitude with respect to the sun. The biased attitude is preferably selected to equalize the solar array's summer and winter solstice output power minimums, thereby maximizing the worst case output power for a single axis of rotation solar array. The solar array is preferably biased by either forming the shim between the solar array drive mechanism and the solar array with the desired bias or by using the Adjustable Solar Wing Actuator (ASWA) available on certain satellites.

4 Claims, 4 Drawing Sheets

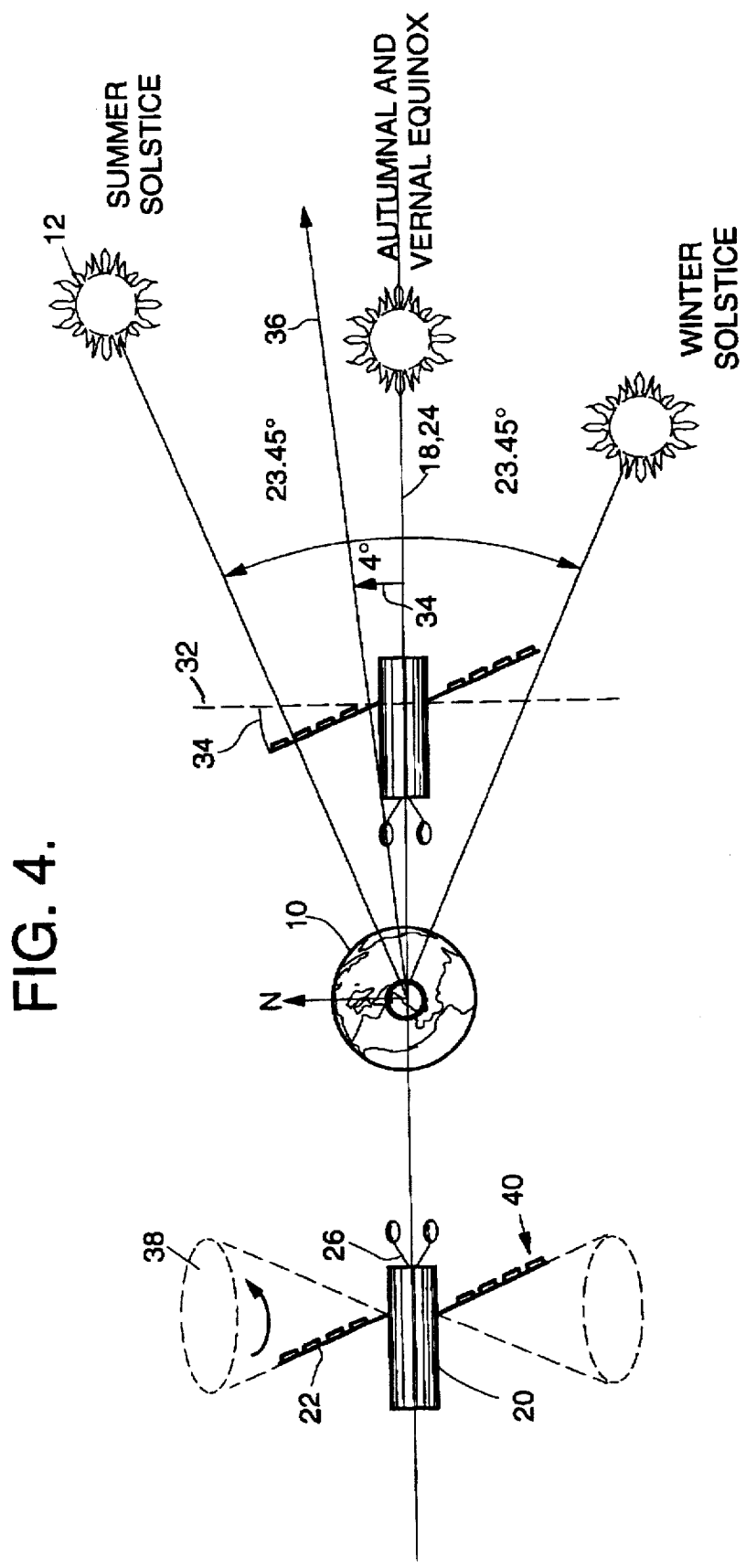

SATELLITE SOLAR ARRAY AND METHOD OF BIASING TO REDUCE SEASONAL OUTPUT POWER FLUCTUATIONS

BACKGROUND OF THE INVENTION

1. Field of the Invention

This invention relates to satellite solar arrays and more specifically to a method for biasing a solar array with respect to its rotational axis to increase the solar array's worst case output power.

2. Description of the Related Art

Satellites orbit the earth to provide point-to-point communications, weather detection, and remote sensing functions. These satellites employ solar arrays, which convert the sun's energy into electrical energy to power the satellite and its subsystems. One type of satellite, commonly known as a 3-axis body stabilized satellite, deploys a pair of solar arrays in a wing configuration along an axis perpendicular to the body of the satellite and its orbital plane.

As the satellite orbits the earth, its attitude is maintained so that the antenna array or sensing devices at the front of the satellite always point towards the earth. This continuously changes the orientation of the satellite, and hence the orientation of the solar array to the sun. As a result, existing satellites rotate the solar arrays around the perpendicular axis to track the daily movement of the sun to maintain the solar array's output power at a high level.

As the earth orbits the sun, the tilt of the earth's spin axis causes the angle or declination of the sun to change. The declination is zero at the autumnal and vernal equinox and attains an absolute maximum of approximately 23.45° at the summer and winter solstices. This seasonal variation also causes the solar array's output power to fluctuate. This seasonal variation in the solar array's output power can be eliminated by providing a second axis of active rotation to track the seasonal movement of the sun. The solar array's minimum output power level is critical because satellites and their payload must be designed to use no more than the minimum output power generated by the solar array. Tracking the seasonal movement, in addition to tracking the daily movement, would maximize the minimum output power of the solar array.

However, 2-axis satellites are not implemented for several reasons. First, the power fluctuations caused by seasonal variations are much less than the fluctuations caused by the orbit of the satellite around the earth. Second, it is not currently cost effective to provide an actuator that is capable of sustaining constant rotation to track the seasonal changes. Furthermore, adding an additional rotation axis and actuator would reduce the satellite's overall reliability and lifetime. Lastly, some fluctuation in the solar array output power is desired. Around the vernal and autumnal equinox the declination of the sun is small enough that the satellite falls in the shadow cast by the earth during its daily orbit. Thus, at equinox the output power must be sufficiently high to not only power the satellite but to recharge its batteries, which then provide power when the satellite is eclipsed.

SUMMARY OF THE INVENTION

In view of the above problems, the present invention increases the worst case output power of a satellite's fixed attitude solar array, thus allowing larger payloads or longer life satellites with no increase in cost.

This is accomplished with a solar array that is attached to a satellite to rotate about a single axis that is perpendicular to the satellite's orbital plane to track the daily movement of the sun, and which is biased at a fixed attitude relative to the rotation axis to maximize the minimum solar array output power in the presence of seasonal variation effects for the single axis fixed attitude solar array. As the satellite orbits about the earth, the solar array rotates about the perpendicular axis along a conical section so that the array faces towards the sun and maintains its biased attitude with respect to the sun. The biased attitude is preferably selected to equalize the solar array's summer and winter solstice output power minimums. For example, when the satellite orbits in the earth's equatorial plane, the solar array is preferably biased approximately 4° from perpendicular, or equivalently 4° towards the sun's position at summer solstice. In this example, the solar array's minimum or worst case output power is increased by approximately 3%.

The solar array is preferably biased in one of two ways. First, the shim between the solar array rotational drive mechanism and the solar array can be fabricated with the desired biased attitude. Second, the Adjustable Solar Wing Actuator (ASWA) available on certain satellites can be used to control the solar array's attitude.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a diagram of the orbit in FIG. 1 from the perspective of the earth's equatorial plane illustrating a single axis of rotation solar array that is biased towards the summer solstice to reduce the effects of seasonal variations on the array's output power in accordance with the present invention;

DETAILED DESCRIPTION OF THE INVENTION

The present invention increases a solar array's worst case output power by biasing the solar array to equalize the local minimums in its output power curve caused by the seasonal variations in the sun's distance to and declination with respect to the earth. Biasing a fixed attitude single axis solar array does not increase the minimum power levels to the extent that providing a second active rotation axis would. However, biasing the solar array has none of the drawbacks associated with providing the second rotation axis, and thus is far more cost effective. Furthermore, biasing the solar array in the manner described does maximize the minimum output power when the solar array is constrained to have a single axis of rotation and a fixed attitude.

The sun's seasonal variations including the summer and winter solstices are described herein from the perspective of the earth's northern hemisphere. For example, a satellite orbiting the earth in its equatorial plane is preferably biased so that the solar array is oriented approximately 4° off the equatorial plane towards the sun's position at the summer solstice. This equalizes the output power minimums at the summer and winter solstices thereby increasing the worst case output power by approximately 3%. As a result, the satellite's payload can be increased and the life of the satellite extended.

Figure 1:
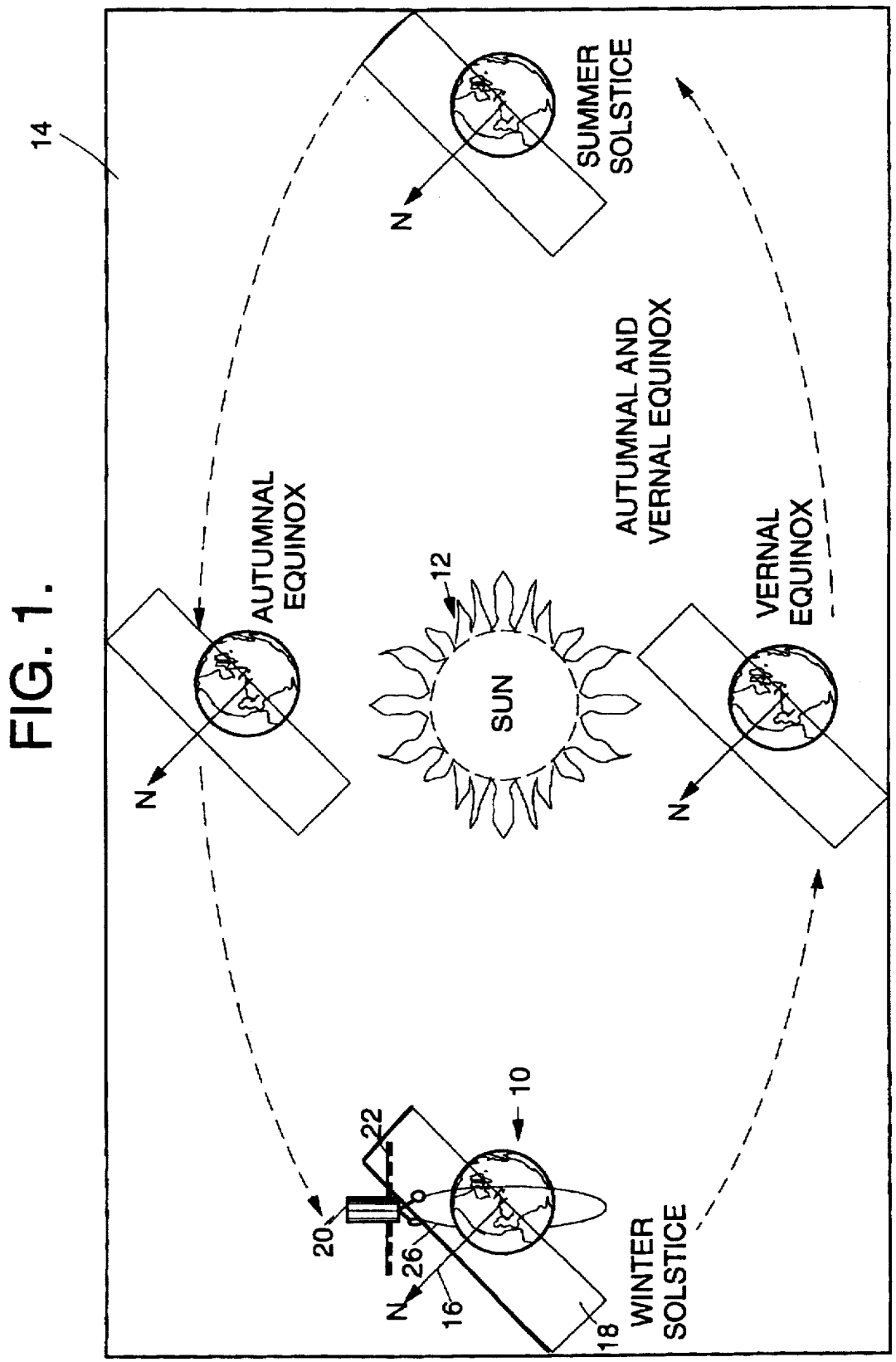
FIG. 1 is an orbital diagram illustrating the seasonal variation of the earth's position with respect to the sun.

As shown in FIG. 1, the earth 10 orbits the sun 12 in a counterclockwise direction in the ecliptic plane 14. The ecliptic plane 14 is the plane that connects the centers of the earth 10 and sun 12. The Earth's axis 16 is tilted by approximately 23.45° so that its equatorial plane 18 intersects the ecliptic plane 14 at the same angle. As the earth 10 orbits the sun 12 the declination of the sun with respect to the earth changes from -23.45° at the winter solstice, to 0° at the vernal equinox, to 23.45° at the summer solstice, and finally to 0° at the autumnal equinox. Furthermore, the earth's orbit about the sun is non-circular with the distance from the earth to the sun at the summer and winter solstices being approximately +3% and -3%, respectively, from the average distance of $1.49 \times 10^8$ Km.

A satellite 20 having a solar array 22 that is deployed in a wing configuration orbits the earth 10 in an orbital plane 24 such that its antenna array 26 points toward the earth. Hughes Aircraft Company produces a number of 3-axis body stabilized satellites including the HS601 as described in the Hughes Space and Communications Group Brochure, 1989. A geostationary orbit, in which the satellite 20 remains in a fixed position above the earth 10 is a common orbit. This occurs when the orbital plane 24 lies in the earth's equatorial plane 18 and the period of the orbit is equal to the period of the earth's rotation, i.e. approximately 24 hours. In general, the satellite 20 can orbit in many different orbital planes 24 with varying periods. For clarity, the present invention will be discussed in reference to a geostationary orbit, however, it is applicable to various orbital planes and periods.

As the satellite 20 orbits the earth 10, the solar array 22 rotates to track the daily movement of the sun 12. In accordance with the invention, the attitude of the solar array 22 is biased by a fixed amount to maximize the array's minimum output power (as shown in detail in FIGS. 4 and 5).

Figure 2:
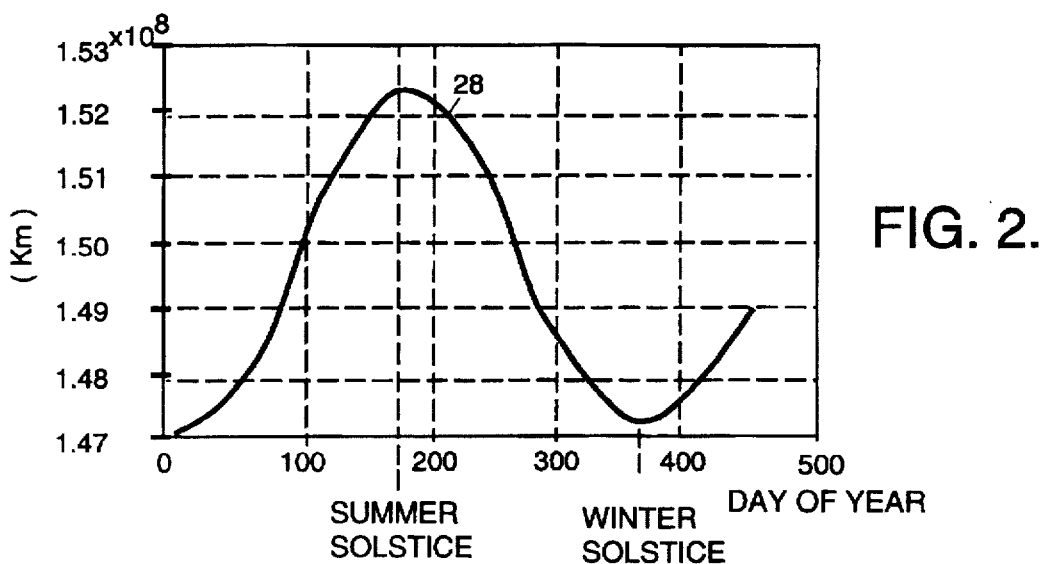
FIG. 2 is a plot of the seasonal variation of the distance between the earth and the sun.

As shown in FIG. 2, a plot 28 of the distance between the earth and the sun varies approximately sinusoidally as a function of the day of the year with a period of 1 year. The maximum distance occurs near the summer solstice and the minimum distance occurs near the winter solstice. The output power of the solar array 22 shown in FIG. 1 is reduced as the distance to the sun is increased and is increased as the distance to the sun is reduced.

Figure 3:
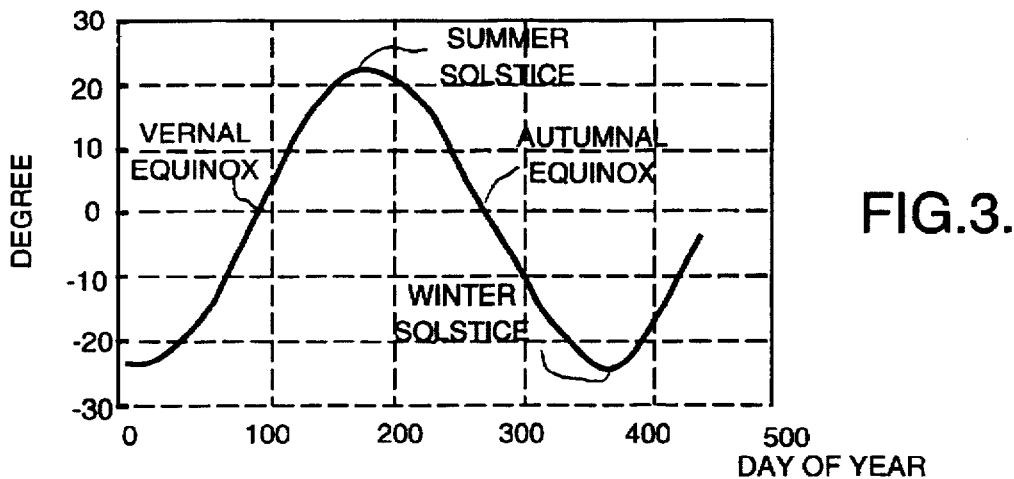
FIG. 3 is a plot of the seasonal variation of sun declination.

As shown in FIG. 3, a plot 30 of the sun's declination with respect to the earth varies approximately sinusoidally as a function of the day of the year with a period of 1 year. The output power of the solar array 22 shown in FIG. 1 is maximum when the declination is 0° at the autumnal and vernal equinox, i.e. the sun is normal to the array 22. The solar array's output power is reduced as the magnitude of the declination increases towards the winter and summer solstices.

FIG. 4 illustrates the seasonal movement of the sun 12 relative to the earth 10 from a point of reference in the earth's equatorial plane 18 when the satellite 20 orbits the earth in a geostationary orbit. The solar array's output power will have local minimums at the summer and winter solstices due to the extreme declinations. However, the local minimum at the summer solstice will be smaller than the local minimum at the winter solstice because of the increased distance to the sun if, as in all known satellites, the solar array 22 is maintained perpendicular to the satellite 20 and its orbital plane 24, which in the geostationary orbit is also the equatorial plane 18.

In accordance with the present invention, the solar array 22 is biased away from the perpendicular rotational axis 32 by a fixed bias angle 34 so that a normal vector 36 to the solar array is oriented away from the equatorial plane 18 and towards the sun's position at the summer solstice to reduce seasonal fluctuations in the output power. This has the desired effect of increasing the smallest local minimum, i.e. the worst case output power. The fixed bias angle 34 is preferably selected, approximately 4° in the particular example, so that the local minimums at the summer and winter solstices are equalized. This is an optimal solution given the limitation of a single axis of active solar array rotation.

As the satellite 20 orbits the earth 10, the solar array 22 rotates about the perpendicular rotational axis 32 at the fixed bias angle 34 so that it traces a conical path 38 as it rotates. As a result, the solar array 22 tracks the daily movement of the sun 12 so that the solar cells 40 on its front surface face the sun and its back surface faces deep space and compensates for the seasonal variations of the sun.

Figure 5:
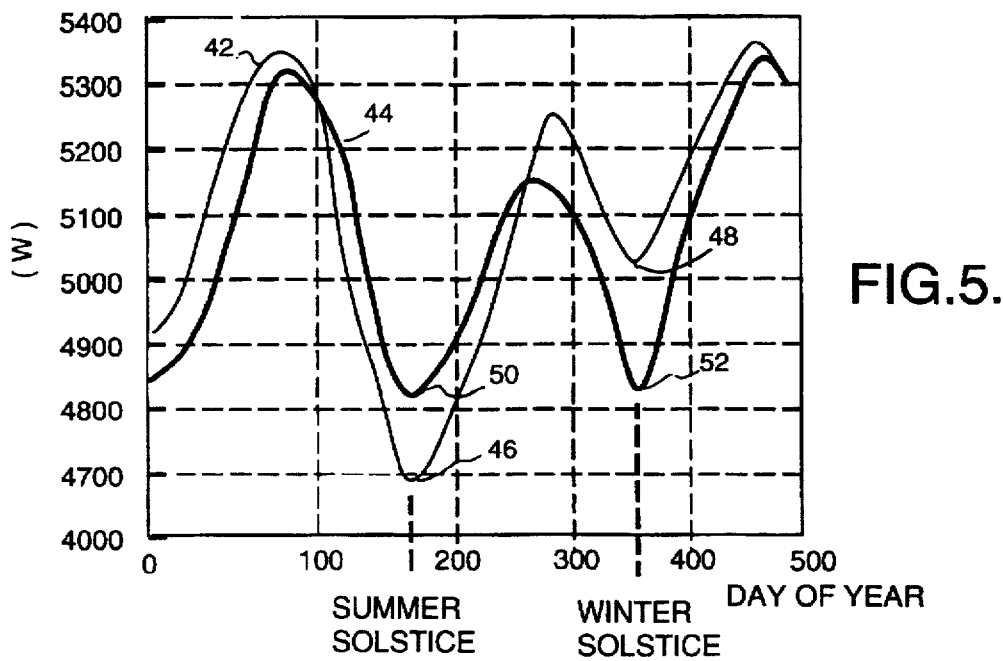
FIG. 5 is a plot of the seasonal variations of solar array output power for a known 1-axis solar array and the biased single axis solar array in FIG. 4.

FIG. 5 shows plots 42 and 44 of the solar array's output power for a known unbiased solar array and the optimally biased solar array of the present invention shown in FIG. 4, respectively. The unbiased solar array generates local power minimums 46 and 48 at the summer and winter solstices, respectively. However, the power minimum 46 at the summer solstice is approximately 7% lower than the power minimum 48 at the winter solstice because of the difference in distances between the summer and winter suns. This differential could be even larger if the satellite's orbital plane did not lie in the equatorial plane. As a result, the satellites power demand and payload must be designed around the worst case minimum at the summer solstice.

In contrast, the biased solar array generates local power minimums 50 and 52 at the summer and winter solstices, respectively, that are approximately equal. Further biasing the solar array towards the summer solstice would increase the power minimum 50 at the summer solstice but would reduce the power minimum 52 at the winter solstice. Thus, the best worst case output power for a 1-axis solar array is obtained by equalizing the local power minimums. For the particular geostationary orbit discussed, the worst case output power is increased by approximately 3%, which can have a substantial impact on the life of the satellite and therefore the cost effectiveness of the satellite or can allow the satellite to support a larger payload. Furthermore, for satellite's that orbit in a plane angled relative to the earth's equatorial plane, the bias required to equalize the local power minimums will be larger, and hence the improvement in the worst case output power will be even more dramatic.

Figure 6:
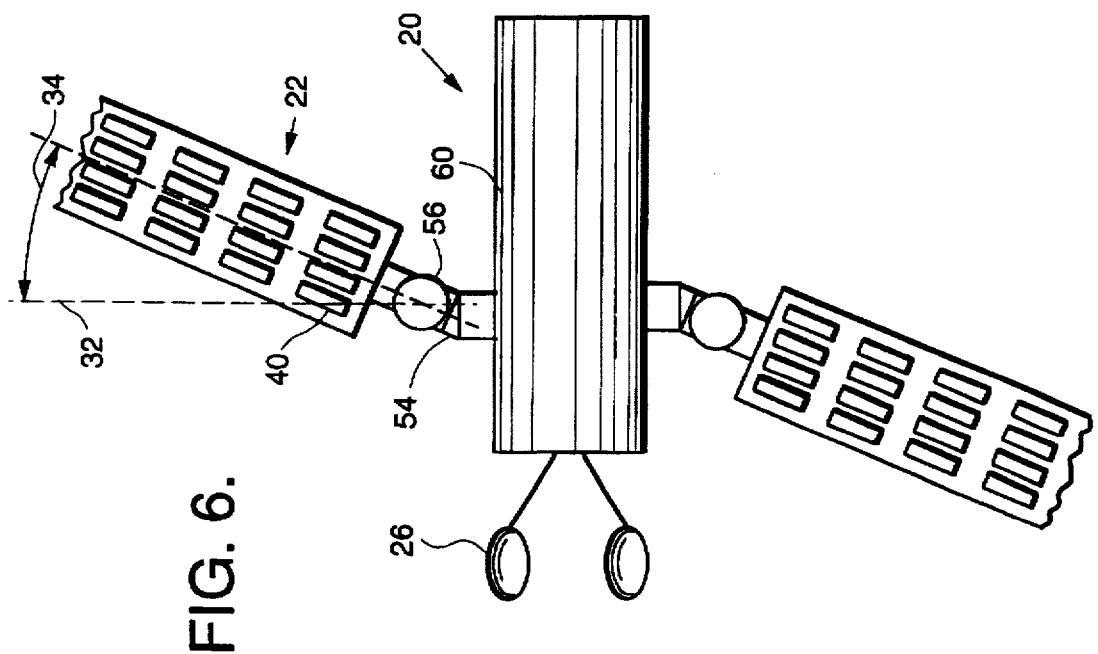
FIG. 6 is a diagram of the solar array illustrating the single axis drive and a shim for biasing the array towards the summer solstice as shown in FIG. 4.

Another advantage of the present invention is that the fixed bias can be implemented using existing hardware. Thus, the invention entails essentially no increase in cost. As shown in FIG. 6, the fixed shim 54 between the solar array's deployment hinge 56 and the wing drive mechanism 58 on the satellite body 60 is machined with the desired bias angle. As a result, the solar array's attitude is biased away from the rotation axis 32 by the selected fixed bias 34. The angled shim 54 provides a pre-launch bias adjustment.

Figure 7:
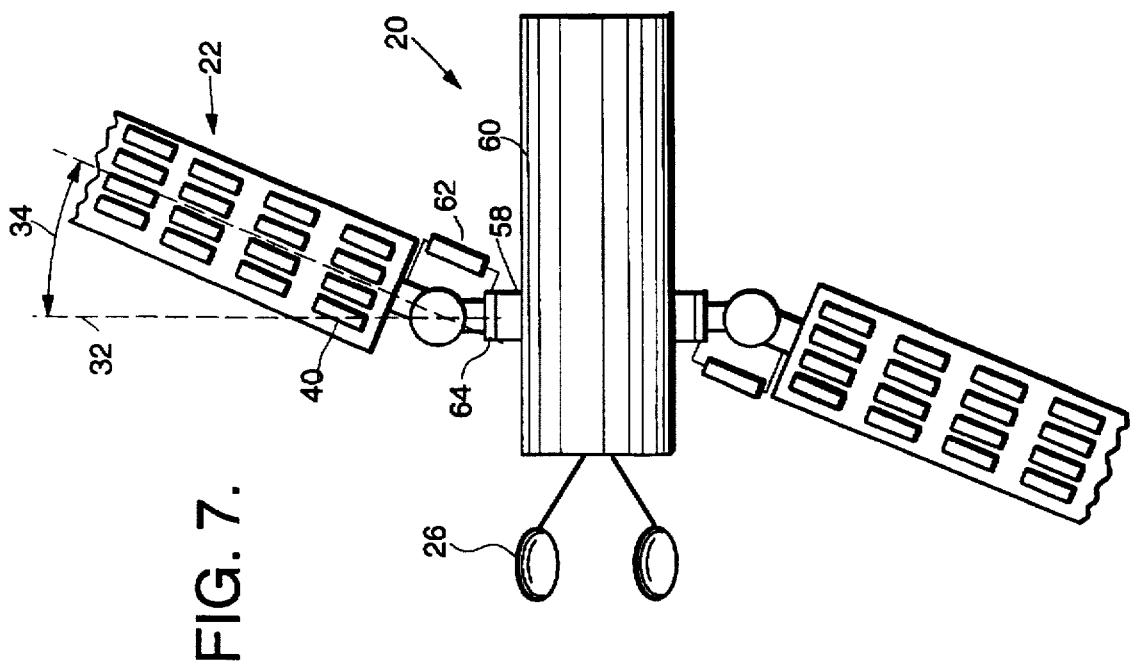
FIG. 7 is a diagram of the solar array illustrating the single axis drive and an actuator for providing the fixed bias.

As shown in FIG. 7, an actuator 62 such as a stepper motor is used to control the deployment hinge 56 to provide the fixed bias 34. A flat shim 64 is used to connect the deployment hinge 56 and the wing drive mechanism 58. A suitable actuator known as an Adjustable Solar Wing Actuator (ASWA) is available on many existing satellites. As disclosed in U.S. Pat. No. 5,310,144 issued May 10, 1994 entitled "Method and Apparatus for Satellite Torque Balancing" and assigned to Hughes Aircraft Company, the ASWA is currently used to compensate for solar torques caused by bending of the solar arrays 22 due to the temperature gradient from the front to the back of the solar arrays. The ASWA does not have the range of motion or reliability necessary to continuously track the seasonal variations, and thus could not be used to provide a full 2nd axis of rotation. However, the ASWA is sufficient to bias the solar arrays 22 by the fixed bias 34.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A satellite for orbiting a central body in an orbital plane, the central body in turn orbiting a sun such that the orientation of the satellite to the sun varies daily and seasonally, comprising:

a satellite body that is maintained in a fixed attitude to the central body during orbit;

a solar array on said satellite, said solar array being deployable in a wing formation to convert the sun's energy into output power to power the satellite wherein said solar array includes a deployment hinge for translating the solar array from a stored position to the deployed wing formation;

a solar array drive mechanism that rotates the deployed solar array about a rotation axis that is perpendicular to the orbital plane to track the daily movement of the sun and thereby reduce fluctuations in the solar array's output power; and a bias mechanism that biases the attitude of the deployed solar array away from said rotation axis by a fixed bias, wherein said bias mechanism is a wedge positioned between the drive mechanism and the solar array, said wedge being formed with an angle equal to the fixed bias, said bias mechanism further comprising an actuator for rotating the solar array about said deployment hinge by the fixed bias, in accordance with the seasonal variations wherein the seasonal variations cause the solar array output power to attain a plurality of local minimums, said bias mechanism biasing the solar array so that the local minimums are approximately the same so that the solar array traces a conical path as it rotates about the rotation axis to maintain the biased attitude to the sun and thereby increase the solar array's worst case output power.

2. The satellite of claim 1, wherein said central body is the earth and the satellite's orbital plane lies substantially in the earth's equatorial plane so that the solar array output power attains its local minimums at the sun's summer and winter solstices, respectively, said bias mechanism biasing the solar array approximately 4° from the rotation axis so that a vector normal to the solar array is oriented approximately 4° off the earth's equatorial plane towards the sun's position at the summer solstice.

3. In a satellite having a solar array and orbiting a central body in an orbital plane, said central body in turn orbiting a sun such that the orientation of the satellite to the sun varies daily and seasonally, a method for increasing the solar array's worst case output power, comprising:

deploying the solar array in a wing configuration that rotates the solar array about a rotation axis that is perpendicular to the orbital plane to track the daily movement of the sun and thereby reduce fluctuations in the solar array's output power wherein said solar array's output power attains a plurality of local minimums due to the seasonal variations, said the solar array being biased so that the local minimums are approximately equal; and biasing the attitude of the deployed solar array away from said rotation axis by a fixed bias in accordance with the seasonal variations so that the solar array traces a conical path as it rotates about the rotation axis to maintain the biased attitude to the sun to maximize the solar array's minimum output power.

4. The method of claim 3, wherein said central body is the earth and the satellite's orbital plane lies substantially in the earth's equatorial plane so that the solar array output power attains its local minimums at the earth's summer and winter solstices, respectively, said bias mechanism biasing the solar array approximately 4° from the rotation axis so that a vector normal to the solar array is oriented approximately 4° off the earth's equatorial plane towards the summer solstice.

* * * * *